(12) United States Patent
Wolf et al.

(10) Patent No.: US 7,104,512 B2
(45) Date of Patent: Sep. 12, 2006

(54) ARTICULATED ARM ESPECIALLY FOR A DEVICE FOR OPTICALLY CAPTURING OBJECTS

(75) Inventors: Martin Wolf, Klaus (AT); Wilfried Pfister, Thüringen (AT); Martin Schwab, Obererlbach (DE)

(73) Assignee: Wolfvision GmbH, Gotzis (AU)

( * ) Notice: Subject to any disclaimer, the term of this patent is extended or adjusted under 35 U.S.C. 154(b) by 0 days.

(21) Appl. No.: 10/498,123

(22) PCT Filed: Feb. 19, 2003

(86) PCT No.: PCT/EP03/01653

§ 371 (c)(1),
(2), (4) Date: Jul. 29, 2004

(87) PCT Pub. No.: WO03/076843

PCT Pub. Date: Sep. 18, 2003

(65) Prior Publication Data

US 2004/0238704 A1 Dec. 2, 2004

(30) Foreign Application Priority Data

Mar. 8, 2002 (DE) ................................ 102 10 244

(51) Int. Cl.
*E04G 3/00* (2006.01)
(52) U.S. Cl. ............................... 248/276.1; 248/281.11

(58) Field of Classification Search ................ 248/121, 248/122.1, 123.11, 125.1, 125.2, 125.3, 124.1, 248/162.1, 161, 414, 157, 919, 276.1, 280.11, 248/281.11, 283.1
See application file for complete search history.

(56) References Cited

U.S. PATENT DOCUMENTS

| 4,160,536 A | * | 7/1979 | Krogsrud ............... 248/280.11 |
| 4,166,602 A | * | 9/1979 | Nilsen et al. .......... 248/280.11 |
| 4,234,150 A | | 11/1980 | Mee et al. ............... 248/281.1 |
| 4,266,747 A | | 5/1981 | Souder, Jr. et al. ...... 248/280.1 |
| 4,335,315 A | * | 6/1982 | Waerve et al. ......... 248/281.11 |

(Continued)

FOREIGN PATENT DOCUMENTS

DE 36 38 157 C1 12/1987

(Continued)

*Primary Examiner*—A. Joseph Wujciak, III
(74) *Attorney, Agent, or Firm*—Oliff & Berridge, PLC

(57) ABSTRACT

An articulated arm for the alignment or a capturing device for optically capturing an object to be placed on a support surface, has—as a conventional double parallelogram arm—a base part, a top part, an articulate part and two pairs of rods which connect the base part or the top part to the articulated part. The articulated arm furthermore has a shaft which is rotatably fastened to the top part and has an operative mechanical connection to one of the rods pivotably fastened to the top part. This operative connection results in a rotation of the shaft relative to the top part on pivoting of the rod.

26 Claims, 2 Drawing Sheets

U.S. PATENT DOCUMENTS

Figure 1:
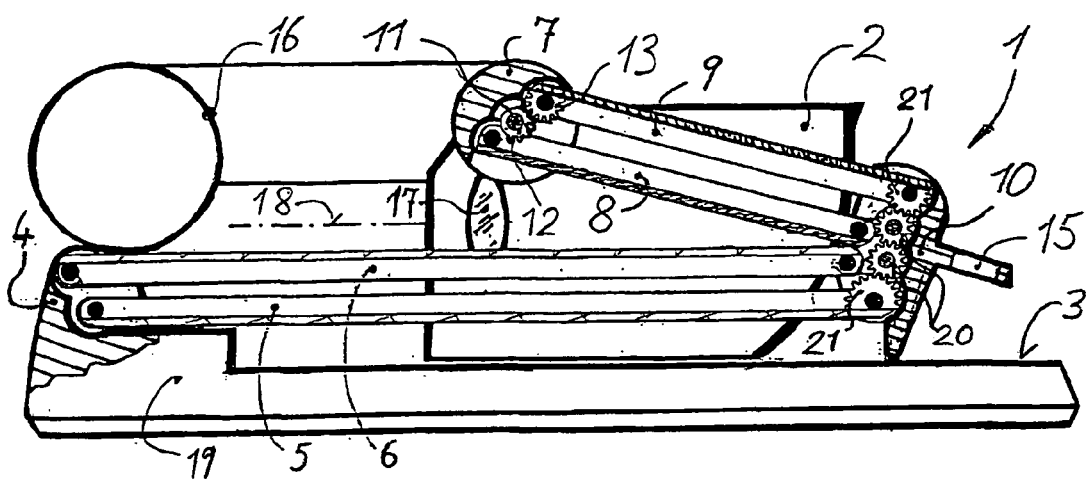

| | | | | |
|---|---|---|---|---|
| 4,548,373 A | * | 10/1985 | Komura | 248/122.1 |
| 4,852,842 A | * | 8/1989 | O'Neill | 248/284.1 |
| 4,881,709 A | * | 11/1989 | Nakamura | 248/281.11 |
| 4,892,278 A | * | 1/1990 | Huang | 362/427 |
| 4,953,822 A | * | 9/1990 | Sharber et al. | 248/281.11 |
| 5,205,522 A | * | 4/1993 | Nakamura | 248/123.11 |
| 5,213,293 A | * | 5/1993 | Muentener et al. | 248/123.11 |
| 5,501,420 A | * | 3/1996 | Watt et al. | 248/280.11 |
| 5,609,316 A | * | 3/1997 | Tigliev | 248/123.11 |
| 6,550,734 B1 | * | 4/2003 | Spadea | 248/280.11 |
| 6,569,084 B1 | * | 5/2003 | Mizuno et al. | 600/102 |
| 6,896,230 B1 | * | 5/2005 | Cvek | 248/276.1 |
| 2004/0238704 A1 | | 12/2004 | Wolf et al. | 248/276.1 |
| 2005/0105181 A1 | | 5/2005 | Wolf | 359/558 |

FOREIGN PATENT DOCUMENTS

| | | |
|---|---|---|
| DE | 38 22 008 A1 | 1/1989 |
| EP | 0 480 232 A2 | 4/1992 |
| EP | 0 568 857 A1 | 11/1993 |
| EP | 1 483 529 B1 | 2/2003 |
| TW | 247608 | 5/1995 |

\* cited by examiner

ARTICULATED ARM ESPECIALLY FOR A DEVICE FOR OPTICALLY CAPTURING OBJECTS

The invention relates to an articulated arm for positioning and orienting a capturing means for optically capturing an object relative to a support surface provided for the object, in at least one position for use and one transport position, according to the precharacterizing clause of claim 1.

Articulated arms have long been known in the form of double parallelogram arms and have proved widely useful in various devices, for example in table lamps, in movable monitor consoles or in telephone swivel arms. An element connected to a base via a double parallelogram arm—for example the lighting means fastened to the parallelogram arm and the lamp base of a desk lamp—have the same orientation relative to one another in different positions.

German Application 38 22 008 A1 discloses a double parallelogram arm in the form of a telephone swivel arm whose two parallelogram arms are coupled by means of engaging gear elements. This imposes a simultaneous pivoting motion of both parallelogram arms.

U.S. Pat. No. 4,234,150 discloses such a coupled double parallelogram arm in the form of a manipulator arm. Moreover a drive motor is provided by which the double parallelogram arm pivotally mounted on the base part is driveable also by means of engaging gear elements. As both parallelogram arms have the same length the distal end of the double parallelogram arm is moveable in a straight line by means of the drive motor.

German Patent 36 38 157 furthermore discloses a reflector-like projector whose projection means is held by means of a double parallelogram arm on the one hand in the transport position, resting on the support surface of the reflector-like projector and, on the other hand, in the position for use, a distance away from the support surface. In the region of the connection of the two parallelogram arms, a gear mechanism imposes a simultaneous movement of the parallelogram arms. Because of the arrangement and owing to the identical length of the two parallelogram arms, the projection means moves along a normal to the support surface.

Overhead projectors and devices for optically capturing objects, whose deflection mirror means and whose capturing means, respectively, are also held by means of such a double parallelogram arm relative to the support surface in a transport position and a position for use, optionally also in further positions, are also known.

It is therefore the object of the invention to eliminate deficiencies of the prior art. Especially it is intended to propose an articulated arm for positioning and orienting a capturing means relative to a base, by means of which articulated arm the capturing means is oriented, in at least two different, predetermined positions of the arm, differently relative to the base.

If the orientation required for a means in the position for use differs from that in the transport position, a means detachably fastened to the double parallelogram arm can be oriented by hand in a manner known per se to meet the respective requirements. The manual orientation on the one hand reduces the convenience of operation and, on the other hand, often necessitates repeated orientation for precise orientation in a predetermined action. This is time-consuming and is often unsatisfactory in use.

It is therefore the object of the invention to eliminate deficiencies of the prior art. Especially it is intended to propose an articulated arm for positioning and orienting a capturing means relative to a base, by means of which articulated arm the capturing means is oriented, in at least two different, predetermined positions of the arm, differently relative to the base.

This object is achieved by an articulated arm in which the top part has at least one shaft rotatably relative to the top part and coupled to the capturing means, wherein an operative mechanical connection between the shaft and at least one of the top rods is provided and designed in such a way that the capturing means is directed to the support surface on changing over to the position for use, wherein a rotation of the shaft is imposed relative to the top part and the top rod during pivoting of the top rod relative to the top part.

Further advantageous or alternative developments and further developments of the invention are described below.

When the term rods is used in association with the invention, elongated, substantially rigid elements in the widest sense are to be understood. These rods can be either solid or can have any desired profile. The profiles of the rods may be, for example, such that rods aligned parallel to one another and opposite to one another engage one another.

An articulated arm according to the invention has—like a conventional double parallelogram arm—a base part, a top part, an articulated part and two pairs of rods which connect the base part and the head part with the articulated arm. In contrast to the prior art, an articulated arm according to the invention furthermore has a shaft which is rotatably mounted on the top part and has an operative mechanical connection to at least one of the rods pivotably fastened to the top part. This operative connection results in a rotation of the shaft relative to the top part when the rod pivots.

In the context of the invention, an operative mechanical connection is to be understood as meaning, for example, engaging gear segments, rod mechanisms or couplings via belts or chains.

A further development of the invention envisages the provision of an articulated arm according to the invention, comprising at least one springy element, for example a coil spring, leaf spring or torsion spring. The springy element is to be mounted in a manner known per se on the articulated arm so that pivoting of the rods results in tensioning and relaxing of the springy element. The springy elements counteract the weight of the held capturing means and of the articulated arm in a manner known per se.

However, it is also possible to provide spring forces exceeding the weights, in order to ensure that the articulated arm automatically assumes the extended position. According to the invention, a locking element holding the articulated arm in the folded position would have to be provided in this case.

Furthermore, at least one, especially a mechanical, braking element which resists pivoting of the rod by means of braking forces can also be mounted on the articulated arm. In interplay with a suitable choice of the springy element, it is thus possible to provide articulated arms according to the invention which hold capturing means in space not only in the folded or extended position but also in any desired intermediate positions. For example, a capturing means can be held in a stable manner thereby a short distance away from the surface on which the device is placed. This is advantageous especially for objects also placed next to the device on the surface. Thus, lateral images of captured objects, for example, architectural models, small machines, aquaria, chemical experimental setups, etc. require capturing means oriented and positioned in this manner.

The invention is explained in more detail below, purely by way of example, with reference to the figures in the drawings.

Figure 2:
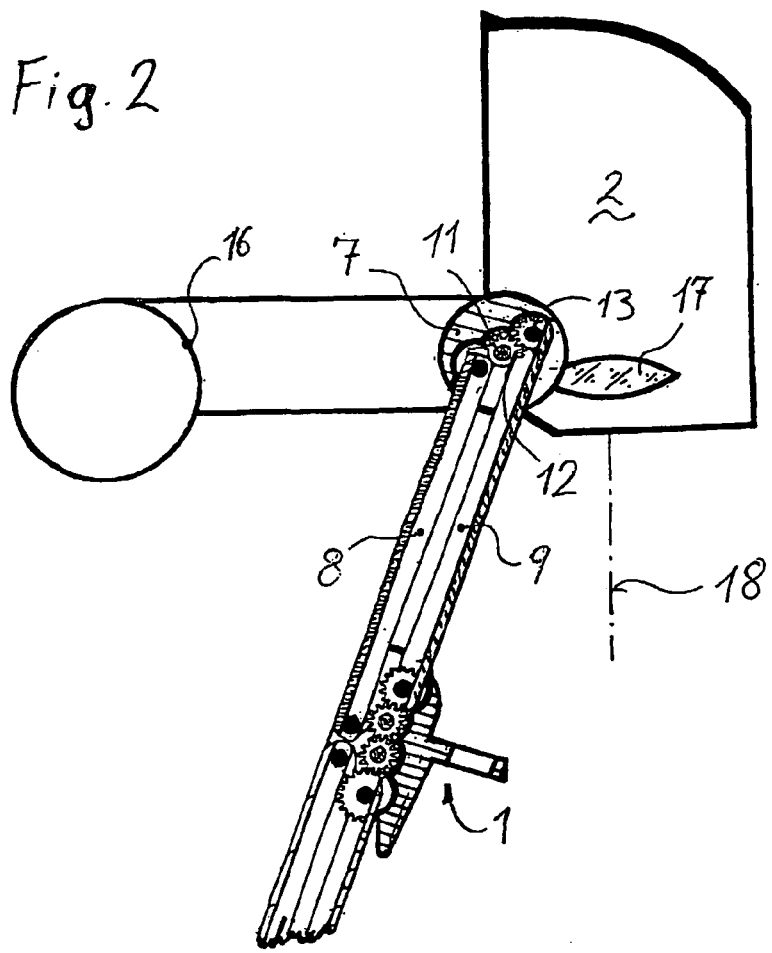
Figure 3:
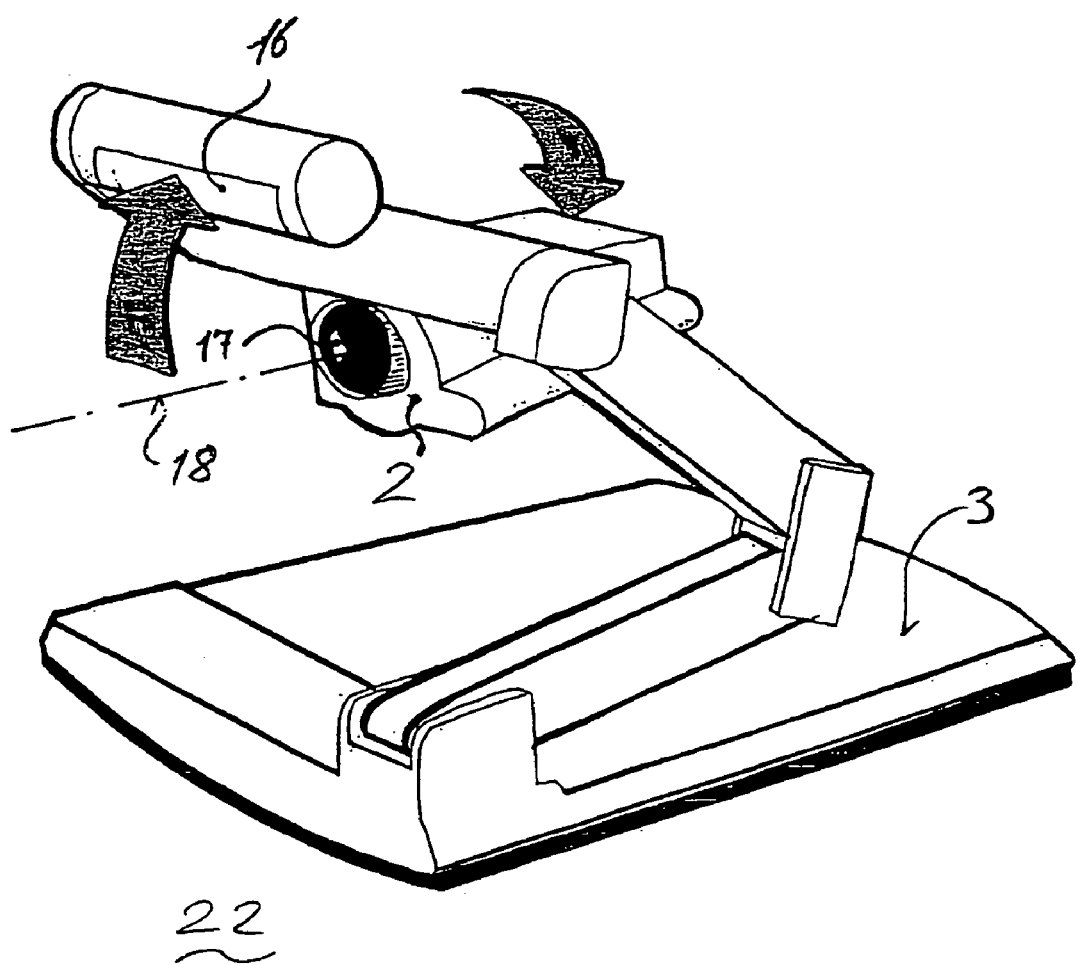

FIG. 1 shows a device for optically capturing objects in the transport position, which is provided with an embodiment of an articulated arm according to the invention, as a side view, FIG. 2 shows a partial view of the device from FIG. 1 in the position for use with extended articulated arm, as a side view, and FIG. 3 shows the device from FIG. 1 in the position for use with partly folded articulated arm, as an oblique view.

FIG. 1 shows a device for optically capturing objects in the transport position with an articulated arm 1 according to the invention, as a side view. Here, the articulated arm 1 assumes the folded position. In addition to the articulated arm 1, the device has an optically capturing means 2 and a lighting means 16.

The articulated arm 1 shown in section is in the form of a double parallelogram arm in a manner known per se and has a base part 4, a top part 7, an articulated part 10, two rods 5, 6 connected to the base and two rods 8, 9 connected to the top. The base and top rods 5, 6 and 8, 9, respectively, which are in the form of U-profiles here, are each provided with a hole on both sides at their ends. At one end, the base and top rods 5, 6 and 8, 9, respectively, are pivotably fastened to the base part 4 and to the top part 7, respectively, by means of the fastening bolts which are inserted into the holes. At the other end, the base and top rods 5, 6 and 8, 9, respectively, are likewise pivotably fastened by means of bolts to the articulated part 10, oriented parallel to one another.

Here, the base part 4 is formed as an integral part of a base housing 19. That side of the base housing 19 which faces the articulated arm 1 is provided with a support surface 3 on which an object to be recorded by the optically capturing means 2 can be placed. It would of course also be possible for the base part and base housing to comprise a multiplicity of parts and to be connected to one another, or to provide a third part with the support surface and to assign this to the base housing.

In addition to the fastening bolts for the pivotable fastening of the base and top rods 5, 6 and 8, 9, respectively, the articulated part 10 has two further bolts for mounting two gear wheels 20. These each engage a gear segment 21 which is located on the joint and which in each case is arranged on the joint end of the base rod 5 or of the top rod 9 and thus form an operative mechanical connection. This imposes, in a manner known per se, the simultaneous pivoting of the base and top rods 5, 6 and 8, 9. Here, the articulated part 10 is moreover provided with a grip piece 15 on which it is possible manually to exert forces by means of which the articulated arm 1 is brought from one position into another position.

According to the invention, the top part 7 has a shaft 11 which has an operative mechanical connection to one of the top rods 8, 9. Here, the operative connection is formed by a first gear segment 12 which is arranged coaxially on the shaft 11 and engages a second gear segment 13. The latter is arranged on the top end of the top rod 9. In principle, it would also be possible for a third gear segment to be arranged at the top end of the other top rod 8 and likewise to engage the first gear segment 12. If the articulated arm 1 is now brought from the folded position into another position, the top rod 9 provided with the second gear segment 13 is pivoted relative to the top part 7. By means of the engaging gears of the first and of the second gear segments 12 and 13, according to the invention the shaft 11—and thus also the capturing means 2 coupled to the shaft 11—is rotated relative to the top part 7. In the case of this type of operative connection, the extent of rotation of the shaft 11 can be determined in a manner known per se as a function of the extent of pivoting of the top rods 8, 9 by an appropriate formation of the two gear segments 12, 13.

In this embodiment, the optically capturing means 2 of the device is locked on the shaft 11 by means of a locking element not shown in FIG. 1—as described in more detail below. The capturing means 2 for optically capturing objects is provided here with a digital camera whose objective is shown schematically by an objective lens 17 and which has an optical axis 18. The images of the captured objects are converted into electrical signals by means of the digital camera.

In the transport position, the optionally elongated capturing means 2 is held horizontally over its length on the support surface 3 by means of the articulated arm 1. The optical axis 18 is aligned parallel to the support surface 3. Furthermore, the lighting means 16 is held horizontally on the base part 4 and aligned parallel with the support surface 3 by means of the articulated arm 1. The lighting means 16 is likewise locked directly to the top part 7.

Owing to the different lengths of the base rods and of the top rods 5, 6 and 8, 9, respectively, neither the capturing means 2 nor the lighting means 16 or the articulated arm 1 extends beyond the edge of the base housing 19. In combination with the orientation of the capturing means 2 and of the lighting means 16, the device has extremely compact dimensions in the transport position—as shown in FIG. 1.

FIG. 2 shows a partial view of the device for optically capturing objects from FIG. 1, comprising the capturing means 2, the lighting means 16 and a part of the articulated arm 1. In contrast to FIG. 1, the device is shown here in the position for use. The articulated arm 1 assumes the preferably extended position. However, the device can also assume a position for use in an intermediate position between the folded position and the extended position—as shown in FIG. 3.

When the device changes over from the transport position shown in FIG. 1 to the position for use shown in FIG. 2, in this embodiment the top rod 9 is pivoted 90° clockwise relative to the top part 7. Since the engaging gear segments 12 and 13 have the same radius, the shaft 11 is likewise rotated 90° counterclockwise relative to the top part 7. The capturing means 2 locked on the shaft 11 is thus also rotated 90° counterclockwise. The optical axis 18 is now oriented at right angles to the support surface 3 not shown in FIG. 2, and especially substantially towards the centre thereof. The capturing means 2 is thus suitably oriented for optically capturing an object placed on the support surface 3.

In this embodiment, the capturing means 2 is oriented differently according to the invention depending on position—on the one hand according to the requirements of the transport position which is shown in FIG. 1 and, on the other hand, according to the requirements of the position for use of the device which are shown in FIG. 2—by the shaft 11 and the operative mechanical connection between the shaft 11 and the top rod 9, which connection is realized by means of the gear segments 12 and 13.

In contrast, the lighting means 16 is locked not on the shaft 11 but on the top part 7, for example by means of a clip which grips around the top part 7 and is provided with a locking element. Thus, the orientation of the lighting means 16 remains unchanged, in a manner known per se, relative to the base part 4, not shown in FIG. 2, on changing over from the transport position to the position for use. If additional lighting is required for capturing an object placed on the support surface, the lighting means 16 is already suitably oriented for this purpose.

FIG. 3 shows the device from FIG. 1 as an oblique view. In contrast to FIG. 1, the device is shown here in a position for use, in which the articulated arm assumes an intermediate position between the folded position and the extended position. The articulated arm can hold the capturing means 2 at different distances from a surface 22 on which the device is placed, by means of springy or braking elements not shown in FIG. 3. In that position of the device which is shown in FIG. 3, images of optically captured objects could be made, for example, of an architectural model which is not shown in FIG. 3 and is mounted in front of the objective lens 17 on the surface 22. Owing to the special requirements of such an application, it may be necessary here to align the optical axis 18 parallel to the support 22. Furthermore, the lighting means 16 should no longer be directed towards the support surface 3 but towards the object to be recorded. By exerting predetermined forces, indicated by two arrows by way of illustration in FIG. 3, on the capturing means 2 and the lighting means 16, these can be released from the respective locking and can be oriented in accordance with the specific requirements.

It would also be possible to provide further locking positions. One further locking position which, when the articulated arm is in the extended state, orients the capturing means 2 exactly with a back-lit slide area not shown in FIG. 3 would be helpful, for example, in the case of relatively frequent capturing slides.

Such a slide area is described in the German Patent Application No. DE 102 10 322.4 filed by the same Applicant, with the title "Auflagefläche eines Geräts zur optischen Aufnahme von Objekten [Support surface of a device for optically capturing objects]". The corresponding U.S. Patent Application was published May 19, 2005, as Publication No. U.S. 2005/0105181A1.

The invention claimed is:

1. An articulated arm for positioning and orienting a capturing means for optically capturing an object relative to a support surface provided for the object at least in a transport position and a position for use, the articulated arm comprising:
   a base part on which two parallel base rods are pivotably fastened at one end,
   a top part on which two parallel top rods are pivotably fastened at one end, and
   an articulated part to which the two base rods and the two top rods are pivotably connected at the other end,
   wherein the top part has at least one shaft pivotably fastened at and rotatable relative to said top part and coupled to the capturing means, and wherein an operative mechanical connection is provided between the shaft and at least one of the two top rods, the operative mechanical connection including a first rotation segment connected to the shaft and at least a second rotation segment connected to one of the two top whereby the capturing means is directed to the support surface upon moving into the position for use, wherein rotation and the top rod during pivoting of the top rod, relative to the top part.

2. An articulated arm according to claim 1, wherein the operative mechanical connection is effected by engaging gear segments, of which a first gear segment is connected to the shaft and an at least a second gear segment is connected to one of the top rods.

3. An articulated arm according to claim 1, wherein the articulated arm has at least one springy element, mounted between the base rods or the top rods, said springy element being tensioned or relaxed on pivoting of the rods.

4. An articulated arm according to claim 1, wherein the base part is firmly connected indirectly or directly to the support surface, and the shaft is detachably locked to the optically capturing means.

5. An articulated arm according to claim 4, wherein on changing over from the transport position to the position for use of the articulated arm, the shaft is rotated 90° relative to the top part.

6. An articulated arm according to claim 4, wherein a lighting device is detachably fastened to the top part.

7. An articulated arm for positioning and orienting a capturing means for optically capturing an object relative to a support surface provided for the object at least in a transport position and a position for use, the articulated arm comprising:
   a base part on which two parallel base rods are pivotably fastened at one end,
   a top part on which two parallel top rods are pivotably fastened at one end, and
   an articulated part to which the two base rods and the two top rods are pivotably connected at the other end,
   wherein the top part has at least one shaft pivotably fastened at and rotatable relative to said top part and coupled to the capturing means, wherein an operative mechanical connection between the shaft and at least one of the two top rods is provided and designed whereby the capturing means is directed to the support surface upon moving into the position for use, wherein rotation during pivoting of the top rod, relative to the top part, and wherein at least one of the two base rods and at least one of the two top rods have an operative mechanical connection which, on movement of the at least one base rod relative to the articulated part, imposes a movement of the at least one top rod relative to said articulated part.

8. An articulated arm according to claim 7, wherein the articulated arm has at least one braking element that is mounted between the base rods and the base part and that resists pivoting of the rods by frictional forces.

9. An articulated arm according to claim 7, wherein articulated arm is provided with a catch that locks the articulated arm in a predetermined position.

10. An articulated arm according to claim 7, wherein the articulated part is provided with a grip piece.

11. An articulated arm according to claim 7, wherein the base part is firmly connected indirectly or directly to the support surface, and the shaft is detachably locked to the optically capturing means.

12. An articulated arm according to claim 11, wherein upon converting from the transport position to the position for use of the articulated arm, the shaft is rotated 90° relative to the top part.

13. An articulated arm according to claim 11, wherein a lighting device is detachably fastened to the top part.

14. A device for optically capturing objects, comprising:
   a support surface on which an object can be placed,
   capturing means for capturing the object placed on the support surface, and
   an articulated arm that positions and orients the capturing means for optically capturing the object relative to the support surface provided for the object at least in a transport position and a position for use, said articulated arm comprising:

a base part on which two parallel base rods are pivotably fastened at one end, a top part on which two parallel top rods are pivotably fastened at one end, and an articulated part to which the two base rods and the two top rods are pivotably connected at the other end, wherein the top part has at least one shaft pivotably fastened at and rotatable relative to said top part and coupled to the capturing means, and wherein an operative mechanical connection is provided between the shaft and at least one of the two top rods, the operative mechanical connection including a first rotation segment connected to the shaft and at least a second rotation segment connected to one of the two top whereby the capturing means is directed to the support surface upon moving into the position for use, wherein rotation and the top rod during pivoting of the top rod, relative to the top part.

15. A device according to claim 14, wherein the operative mechanical connection is effected by engaging gear segments, of which a first gear segment is connected to the shaft and an at least a second gear segment is connected to one of the top rods.

16. A device according to claim 14, wherein the articulated arm has at least one springy element mounted between the base rods or the top rods, said springy element being tensioned or relaxed on pivoting of the rods.

17. A device according to claim 14, wherein the base part is firmly connected indirectly or directly to the support surface, and the shaft is detachably locked to the optically capturing means.

18. A device according to claim 17, wherein on changing over from the transport position to the position for use of the articulated arm, the shaft is rotated 90° relative to the top part.

19. A device according to claim 17, wherein the capturing means is provided with a digital camera for converting images of the captured objects to electrical signals.

20. A device for optically capturing objects, comprising:
a support surface on which an object can be placed,
capturing means for capturing the object placed on the support surface, and
an articulated arm that positions and orients the capturing means for optically capturing the object relative to the support surface provided for the object at least in a transport position and a position for use said articulated arm comprising:

a base part on which two parallel base rods are pivotably fastened at one end, a top part on which two parallel top rods are pivotably fastened at one end, and an articulated part to which the two base rods and the two top rods are pivotably connected at the other end, wherein the top part has at least one shaft pivotably fastened at and rotatable relative to said top part and coupled to the capturing means, wherein an operative mechanical connection between the shaft and at least one of the two top rods is provided and designed whereby the capturing means is directed to the support surface upon moving into the position for use, wherein rotation during pivoting of the top rod, relative to the top part, and wherein at least one of the two base rods and at least one of the two top rods have an operative mechanical connection which, on movement of the at least one base rod relative to the articulated part, imposes a movement of the at least one top rod relative to said articulated part.

21. A device according to claim 20, wherein the articulated arm has at least one braking element that is mounted between the base rods and the base part and that resists pivoting of the rods by frictional forces.

22. A device according to claim 20, wherein the articulated arm is provided with a catch that locks the articulated arm in a predetermined position.

23. A device according to claim 20, wherein the articulated part is provided with a grip piece.

24. A device according to claim 20, wherein the base part is firmly connected indirectly or directly to the support surface, and the shaft is detachably locked to the optically capturing means.

25. A device according to claim 24, wherein upon converting from the transport position to the position for use of the articulated arm, the shaft is rotated 90° relative to the top part.

26. A device according to claim 24, wherein the capturing means is provided with a digital camera for converting images of the captured objects to electrical signals.

* * * * *

UNITED STATES PATENT AND TRADEMARK OFFICE
CERTIFICATE OF CORRECTION

| | | |
|---|---|---|
| PATENT NO. | : 7,104,512 B2 | Page 1 of 2 |
| APPLICATION NO. | : 10/498123 | |
| DATED | : September 12, 2006 | |
| INVENTOR(S) | : Martin Wolf, Wilfried Pfister and Martin Schwab | |

It is certified that error appears in the above-identified patent and that said Letters Patent is hereby corrected as shown below:

On the title page, item [54] and column 1, line 1: please change "ARTICULATED ARM ESPECIALLY FOR A DEVICE FOR OPTICALLY CAPTURING OBJECTS" to --ARTICULATED ARM FOR A DEVICE FOR OPTICALLY CAPTURING OBJECTS--

Item (73), please change "(AU)" to --(AT)--

Item (30), please change "102 10 244" to --102 10 244.9--

Please amend the claims as follows:

Column 5, lines 58-59, please change "one of the two top whereby" to --one of the two top rods whereby--

Column 5, line 61, please change "rotation and the top rod" to --rotation of the shaft is imposed relative to the top part and the top rod--

Column 6, line 33, please change "rotation during pivoting" to --rotation of the shaft is imposed relative to the top part and the top rod during pivoting--

Column 7, lines 14-15, please change "one of the two top whereby" to --one of the two top rods whereby--

UNITED STATES PATENT AND TRADEMARK OFFICE
CERTIFICATE OF CORRECTION

PATENT NO. : 7,104,512 B2
APPLICATION NO. : 10/498123
DATED : September 12, 2006
INVENTOR(S) : Martin Wolf, Wilfried Pfister and Martin Schwab It is certified that error appears in the above-identified patent and that said Letters Patent is hereby corrected as shown below:

Column 7, line 17, please change "rotation and the top rod" to --rotation of the shaft is imposed relative to the top part and the top rod--

Column 8, line 16, please change "rotation during pivoting" to --rotation of the shaft is imposed relative to the top part and the top rod during pivoting--

Signed and Sealed this

Fifteenth Day of January, 2008

JON W. DUDAS
*Director of the United States Patent and Trademark Office*